(12) United States Patent
Hodge

(10) Patent No.: US 11,729,298 B2
(45) Date of Patent: Aug. 15, 2023

(54) VIDEO KIOSK INMATE ASSISTANCE SYSTEM

(71) Applicant: **GLOBAL TEL*LINK CORPORATION**, Reston, VA (US)

(72) Inventor: Stephen Lee Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 15/692,157

(22) Filed: Aug. 31, 2017

(65) Prior Publication Data

US 2019/0065286 A1 Feb. 28, 2019

(51) Int. Cl.

| | |
|---|---|
| H04L 67/63 | (2022.01) |
| H04W 4/021 | (2018.01) |
| G06Q 20/40 | (2012.01) |
| H04L 65/75 | (2022.01) |
| G06Q 50/10 | (2012.01) |
| H04L 65/1069 | (2022.01) |
| G06Q 30/06 | (2023.01) |
| G06Q 20/18 | (2012.01) |
| H04L 9/40 | (2022.01) |
| H04W 12/06 | (2021.01) |
| H04W 12/63 | (2021.01) |
| H04L 67/54 | (2022.01) |

(Continued)

(52) U.S. Cl.
CPC ............ *H04L 67/63* (2022.05); *G06Q 20/18* (2013.01); *G06Q 20/4015* (2020.05); *G06Q 30/06* (2013.01); *H04L 63/00* (2013.01); *H04L 63/083* (2013.01); *H04L 63/18* (2013.01); *H04L 65/1069* (2013.01); *H04L 65/764* (2022.05); *H04L 67/54* (2022.05); *H04W 4/021* (2013.01); *H04W 12/06* (2013.01); *H04W 12/63* (2021.01); *G06Q 50/10* (2013.01); *H04L 67/52* (2022.05); *H04W 12/64* (2021.01)

(58) Field of Classification Search
CPC . G06F 9/541; H04W 12/00503; H04W 4/021; H04W 12/06; G06Q 20/18; G06Q 20/401; G06Q 30/06; G06Q 50/10; H04L 63/00; H04L 63/083; H04L 63/18; H04L 65/1069; H04L 65/604; H04L 67/24; H04L 67/327; H04L 67/18
See application file for complete search history.

(56) References Cited

U.S. PATENT DOCUMENTS

| | | | |
|---|---|---|---|
| 5,666,442 A | 9/1997 | Wheeler | |
| 7,529,357 B1 | 5/2009 | Rae et al. | |

(Continued)

*Primary Examiner* — S. Sough
*Assistant Examiner* — Kimberly L Jordan
(74) *Attorney, Agent, or Firm* — Sterne, Kessler, Goldstein & Fox P.L.L.C.

(57) ABSTRACT

A video kiosk inmate assistance system is disclosed herein. A kiosk management server receives, from an inmate agent device, a login request to a presence based service. Further, the kiosk management server authenticates the client device based on client credentials and sets a presence status of a client to available. In addition, the kiosk management server determines client information corresponding to the client, and transmits the client information to a kiosk device located in a booking facility based on the presence status. Additionally, the kiosk management server receives a selection of the client from the kiosk device, and initializes an out of band communication channel between the client device and the kiosk device.

18 Claims, 9 Drawing Sheets

(51) Int. Cl.
  *H04W 12/64*   (2021.01)
  *H04L 67/52*   (2022.01)

(56) References Cited

U.S. PATENT DOCUMENTS

| | | |
|---|---|---|
| 8,502,643 B2 | 8/2013 | Oberman et al. |
| 9,763,271 B1* | 9/2017 | Gabel .................... H04W 76/10 |
| 2002/0029146 A1 | 3/2002 | Nir |
| 2003/0195806 A1 | 10/2003 | Willman et al. |
| 2007/0156827 A1* | 7/2007 | Lu .......................... H04L 51/043 |
| | | 709/206 |
| 2007/0239473 A1 | 10/2007 | Picolli |
| 2011/0213618 A1* | 9/2011 | Hodge .................... G07F 19/20 |
| | | 705/1.1 |
| 2012/0079045 A1* | 3/2012 | Plotkin ................... H04L 51/12 |
| | | 709/206 |
| 2013/0225282 A1* | 8/2013 | Williams .............. A63F 13/216 |
| | | 463/29 |
| 2016/0019555 A1 | 1/2016 | Boles et al. |
| 2016/0034851 A1 | 2/2016 | Xiao et al. |
| 2017/0193478 A1* | 7/2017 | Dhurka ................ G07G 1/0054 |
| 2019/0020696 A1* | 1/2019 | Winawer ............. H04L 65/1073 |

* cited by examiner

VIDEO KIOSK INMATE ASSISTANCE SYSTEM

FIELD OF THE INVENTION

This disclosure relates to a video kiosk inmate assistance system.

BACKGROUND OF THE INVENTION

An inmate confined to an inmate booking environment, such as a central booking and intake facility or prison, may require the assistance of an inmate agent. For example, an inmate may require an attorney for legal representation, and/or a bail bondsperson to help the inmate post bond in order to be released from the inmate booking facility. However, many inmates lack the means to find inmate agents and/or communicate with inmate agents during their confinement. Further, current inmate booking environments fail to provide an opportunity for inmate agents to efficiently, securely, and confidentially assist inmates.

BRIEF DESCRIPTION OF THE DRAWINGS/FIGURES

A further understanding of the invention can be obtained by reference to a preferred embodiment set forth in the illustrations of the accompanying drawings. Although the illustrated embodiment is merely exemplary of systems for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which.

DETAILED DESCRIPTION OF THE INVENTION

As required, a detailed illustrative embodiment of the invention is disclosed herein. However, techniques, systems and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. The following presents a detailed description of the preferred embodiment of the invention.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Figure 1:
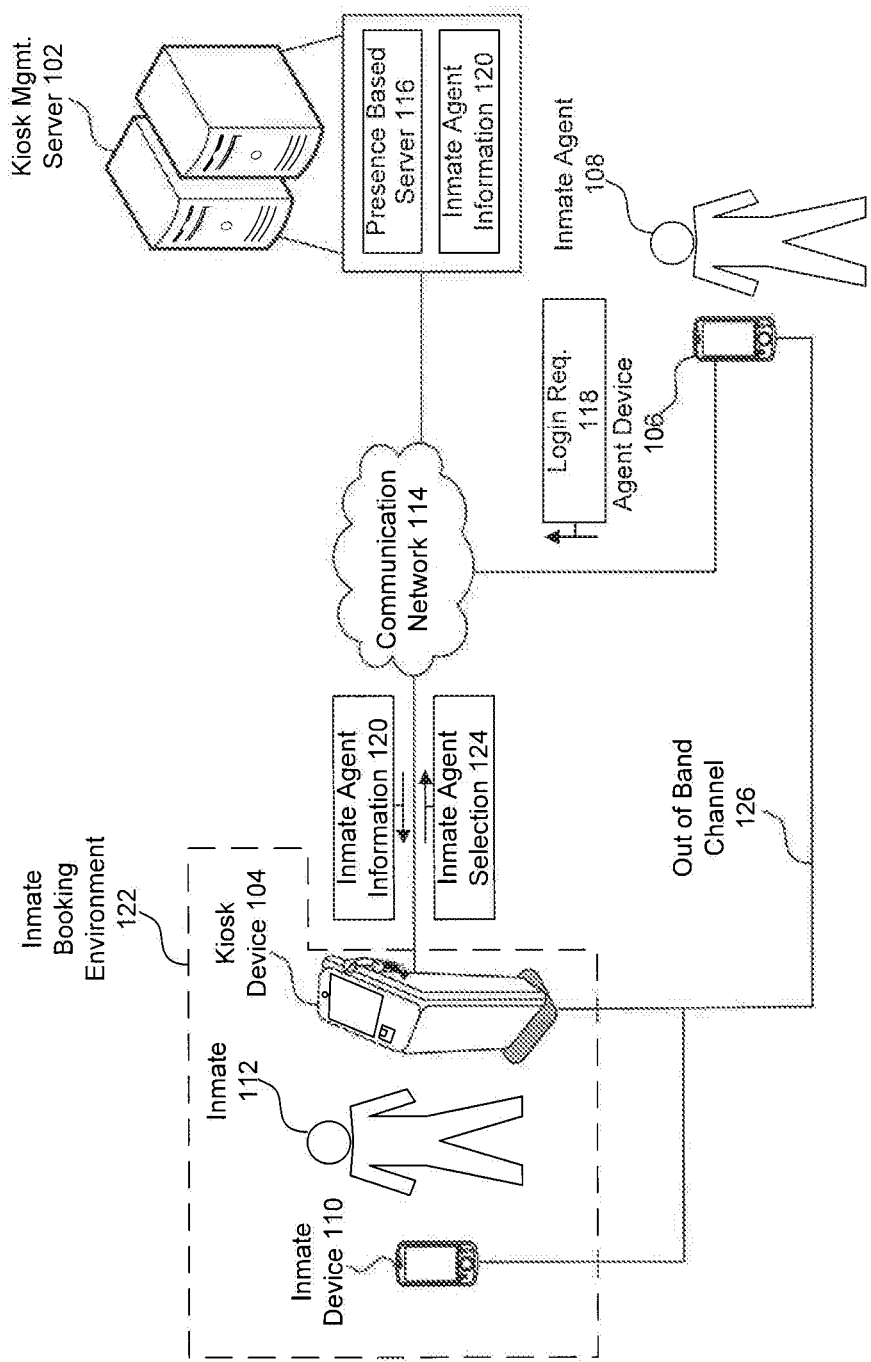
FIG. 1 illustrates a block diagram of an example framework for providing a video kiosk inmate system in an inmate booking environment, according to exemplary embodiments.

FIG. 1 illustrates a block diagram of an example framework for providing a video kiosk inmate system 100, according to an exemplary embodiment. FIG. 1 shows interactions between a kiosk management server 102, a kiosk device 104, an agent device 106 associated with an inmate agent 108, and an inmate device 110 associated with an inmate 112, via a communication network(s) 114. The communication network 114 may include any or all of a private network, personal area network (PAN), Local-Area Network (LAN), a Wide-Area Network (WAN), or the Internet.

In some embodiments, the inmate agent 108 (e.g., a bail bondsperson or attorney) utilizes the agent device 106 to log into a presence based service 116 of the kiosk management server 102. The presence based service 116 monitors the availability of a plurality of inmate agents, such as the inmate agent 108, to provide legal services or bail bond services to inmates, such as the inmate 112. In addition, the presence based service 116 manages communication between the agent device 106 and the kiosk management server 102, the kiosk device 104, and/or the inmate device 110.

For example, the agent device 106 sends a login request 118 to the presence based service 116 via the communication network 114. In some embodiments, the login request 118 includes a client identifier 120 corresponding to the inmate agent 108, and a client credential 122. Upon receipt of the login request 118, the presence based service 116 authenticates the agent device 106. For example, the presence based service 116 determines whether the client credential 122 matches locally stored authentication information associated with the client identifier 120. If the agent device 106 successfully authenticates to the presence based service 116, the agent device 106 is logged into the presence based service 116. Further, the kiosk management server 102 sends inmate agent information 124 associated with the inmate agent 108 to the kiosk device 104 via the communication network 114.

In some embodiments, the inmate agent information 124 indicates to the kiosk device 104 that the inmate agent 108 is available to provide services to the inmate 112 via the kiosk device 104. Further, the inmate agent information 124 indicates the services that the inmate agent 108 provides to inmates within an inmate booking environment 126 (e.g., central booking and intake facility, prison, etc.). Additionally, the inmate agent information 124 includes biographical information of the inmate agent 108, contact information associated with the inmate agent 108, reviews of past services provided by the inmate agent 108, pricing information associated with the inmate agent 108, and/or payment information associated with the inmate agent 108. Some examples of services the inmate agent 108 may provide include legal representation or bail bond services. Upon receipt of the inmate agent information 124, the kiosk device 104 presents the inmate agent information 124 to users of the kiosk device 104. In certain embodiments, the kiosk device 104 presents a graphical representation of the inmate agent information 124 via a display interface of the kiosk device 104.

For instance, the inmate 112 may be confined to the inmate booking environment 126 in accordance with an arrest or detainment. Further, the inmate 112 may require assistance from the inmate agent 108 while confined to the inmate booking environment 126. As an example, the inmate 112 may require assistance posting bond in order to be released from the inmate booking environment 126, and/or legal representation. As such, the inmate 112 may view the inmate agent information 124 via the kiosk device 104, and select to communicate with the inmate agent 108. In some embodiments, the inmate agent information 124 is presented to the inmate 112 based on one or more attributes of the inmate agent 108 or inmate 112. For instance, the kiosk device 104 presents the inmate agent information 124 to the inmate 112 based on a shared location of the inmate agent 108 and the inmate 112, a service fee of the inmate agent 112, a charge made against the inmate 112, and/or the bail amount set for the inmate 112.

In response to the inmate selecting to communicate with the inmate agent 108, the kiosk device 104 sends an inmate agent selection 128 to the kiosk management server 102 via the communication network 114 indicating that the inmate 112 requests to communicate with the inmate agent 108.

In some embodiments, upon receipt of the inmate agent selection 128, the kiosk management server 102 establishes an out of band communication channel 130 between the agent device 106 and the kiosk device 104. For example, the presence based service 116 establishes a video communication channel, a voice communication channel, and/or textual communication channel between the agent device 106 and the kiosk device 104. In some other embodiments, upon receipt of the inmate agent selection 128, the kiosk management server 102 establishes the out of band communication channel 130 between the agent device 106 and the inmate device 110.

Once the out of band communication channel 130 is established, the inmate 112 and the inmate agent 108 can arrange, via the out of band communication channel 130, for the inmate agent 108 to post bond for the inmate 112, according to some embodiments. In some other embodiments, the inmate 112 and the inmate agent 108 can configure location monitoring of the inmate 112 via the inmate device 110 via the out of band communication channel 130 according to some embodiments. In yet still some other embodiments, the inmate 112 and the inmate agent 108 can arrange for the inmate agent 108 to provide legal representation to the inmate 112 and discuss legal issues facing the inmate 112 via the out of band communication channel 130.

Further, in some embodiments, the kiosk management server 102 includes inmate information 132 associated with the inmate 112. In some examples, the inmate information 132 includes charges brought against the inmate 112, a bail amount set for release of the inmate 112, and a fine amount levied against an inmate 112. Once the inmate agent 108 and the inmate 112 enter a service agreement, the kiosk management server 102 sends the inmate information 132 to the agent device 106. For instance, once the out of band communication channel 130 is established, the kiosk management server 102 sends the inmate information 132 to the agent device 106. Upon receipt of the inmate information 132, the inmate agent 108 may further assist the inmate 112. For example, the inmate agent 108 may provide legal advice in view of the charges brought against the inmate, arrange to post bail in the amount of the bail amount set for release of the inmate 112, and/or arrange for payment of the fine amount levied against the inmate 112.

Some examples of the inmate device 110 and/or agent device 106, include smart phones and mobile communication devices, tablet computing devices, desktops, laptops, netbooks and other portable computers, wearable computing devices, and any other computing device capable of sending communications to the kiosk management server 102 and/or the kiosk device 104.

Figure 2:
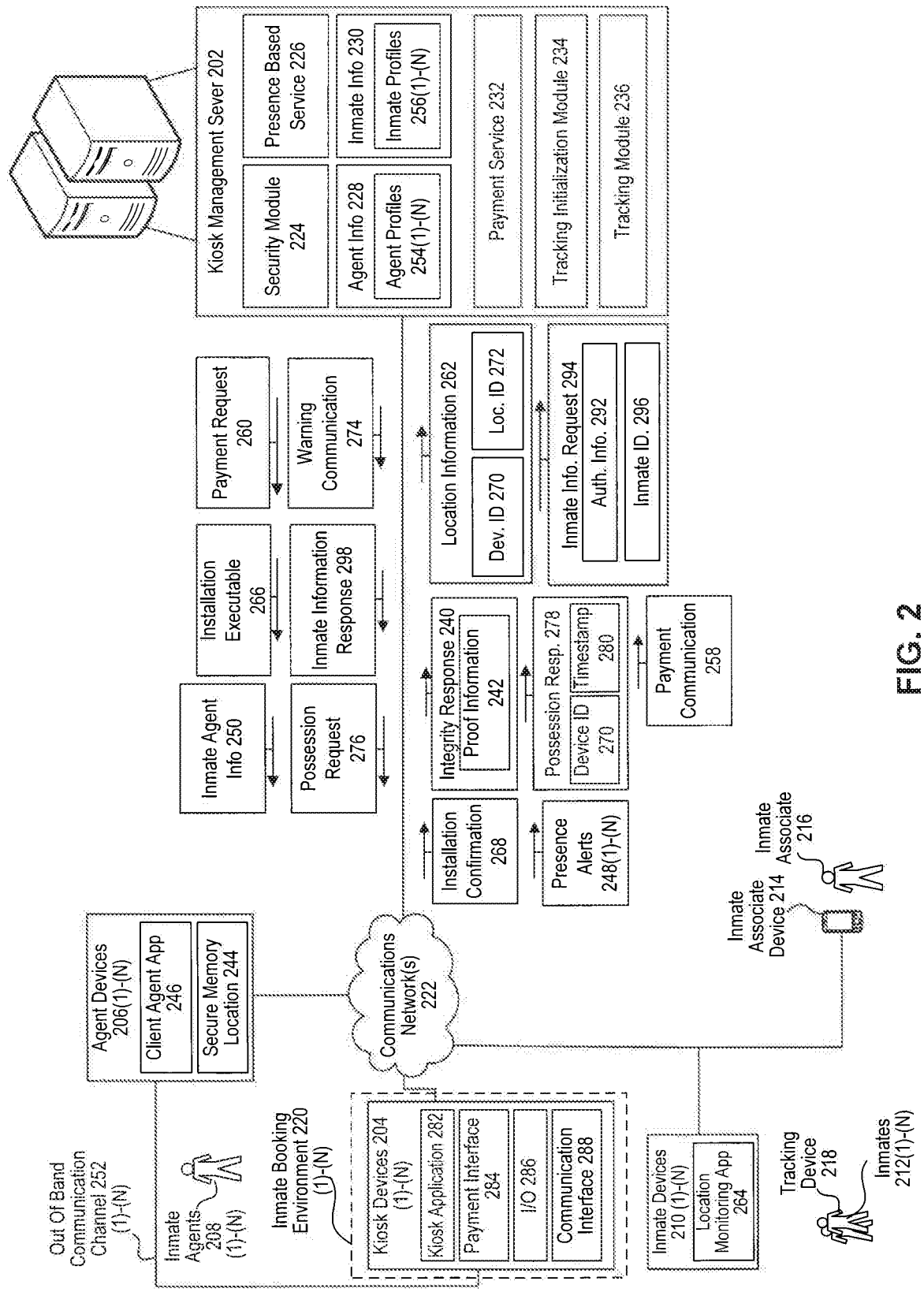
FIG. 2 illustrates a block diagram of an example framework for providing a video kiosk inmate system in an inmate booking environment, according to exemplary embodiments.

FIG. 2 illustrates a block diagram of an example framework for providing a video kiosk inmate system 200, according to an exemplary embodiment. As shown in FIG. 2, the video kiosk inmate system 200 includes a kiosk management server 202, a plurality of kiosk devices 204 (e.g., kiosk device 104), a plurality of agent devices 206 (e.g., agent device 106) associated with a plurality of inmate agents 208, a plurality of inmate devices 210 associated with a plurality of inmates 212, an inmate associate device 214 associated with an inmate associate 216, and a tracking device 218.

In some embodiments, individual video kiosk devices 204 are located within individual inmate booking environments 220 for use by the inmates 212 within the inmate booking environments 220. Further, the individual inmate agents 208 are associated with particular agent devices 206. For example, a first inmate agent 208(1) is associated with a first inmate agent device 206(1), an nth inmate agent 208(N) is associated with an nth inmate agent device 206(N), and so forth. Additionally, individual inmates 212 are associated with particular inmate devices 210. For example, a first inmate 212(1) is associated with a first inmate device 210(1), an nth inmate 212(N) is associated with an nth inmate device 210(N), and so forth.

As illustrated in FIG. 2, the kiosk management server 202, the plurality of kiosk devices 204, the plurality of agent devices 206, the plurality of inmate devices 210, the inmate associate device 214, and the tracking device 218 are coupled via a communication network(s) 222. The communication network(s) 222 may include any or all of a private network, personal area network (PAN), Local-Area Network (LAN), a Wide-Area Network (WAN), or the Internet. Further, the connection between any of the kiosk management server 202, the plurality of kiosk devices 204, the plurality of agent devices 206, the plurality of inmate devices 210, the inmate associate device 214, or the tracking device 218, and the communication network(s) 222 may be a wireless connection (e.g., Bluetooth™, Wi-Fi connection, etc.), or a wired connection (e.g., Ethernet, universal serial bus (USB), etc.).

As shown in FIG. 2, the kiosk management server 202 includes a security module 224, a presence based service 226, agent information 228, inmate information 230, a payment service 232, a tracking initialization module 234, and a tracking module 236. The security module 224 performs authentication and authorization of the clients (i.e., the inmate agents 208, the inmates 212, and the inmate associate 216), and/or the client devices (i.e., the kiosk device 204, the agent devices 206, the inmate devices 210, the inmate associate devices 214, and tracking device 218) of the kiosk management server 202. Further, in certain embodiments, the security module 224 performs encryption and decryption of data transmitted between the kiosk management server 202 and the client devices.

In addition, the security module 224 manages authentication information and authorization information for performing authentication and authorization of the clients and client devices. Some examples of authentication information include authentication credentials, user identifiers, device identifiers, passwords, certificates, cookies, tokens, etc. Some examples of authorization information include access control lists (ACLs), client capabilities, client device capabilities, security policy information, etc.

Additionally, in some embodiments, the security module 224 performs integrity checks of the client devices. For example, the security module 224 determines whether the firmware or operating system of an inmate device 210(1) has been compromised. As another example, the security module 224 determines whether an unauthorized hardware component has been connected to the inmate device 210(1). Further, the security module 224 determines whether one or more required applications/features are installed and/or functional on the inmate device 210(1).

As shown in the FIG. 2, the kiosk management server 202 sends a integrity request 238 to the inmate device 210(1). In response, the inmate device 210(1) sends an integrity response to the kiosk management server 202. Upon receipt of the integrity response 240, the security module 224 verifies the integrity of the inmate device 210 based upon the integrity response 240. In some embodiments, the integrity response 240 includes proof information 242 that can be used to determine the integrity of the inmate device 210(1). In some examples, the proof information 242 can include data describing version information corresponding to the applications installed on the inmate device 210(1). Additionally, or alternatively, the proof information 242 can include a hash value generated by the inmate device 210(1) using objects (i.e., identifiers, secrets, passwords, certificates, etc.) associated with the inmate device 210(1). In some embodiments, the hash value is generated based on challenge information included in the integrity request 238. For example, the inmate device 210(1) may generate a cryptographic hash based on a secret associated with the inmate device 210(1) and the contents of the integrity request 238.

Further, the security module 224 manages the secure storage of inmate information 230 on agent devices 206. As described above, the kiosk management server 202 sends the inmate information 230 to the agent devices 206 in order for the inmate agents 208 to assist the inmates 212. In some embodiments, the inmate information 230 includes privileged and confidential information associated with the inmates 212. As such, the security module 224 manages the creation of secure memory locations 244 on the agent devices 206, and storage of portion s of the inmate information 230 within the secure memory location 244. In some embodiments, the contents of the secure memory locations 244 are encrypted and/or password protected on the agent devices 206. Further, the security module 224 may employ client agent applications 246 installed on the agent devices 206 to create the secure memory locations 244 and store the inmate information 230 within the secure memory locations 244.

As described above, the presence based service 226 manages the availability of the inmate agents 208 to assist the inmates 212. In some embodiments, the inmate agents 208 complete a registration process with the presence based service 226. During the registration process, inmate agents 208 submit registration information and receive a service account. Further, in certain embodiments, the registration process includes a verification step that includes verifying that inmate agents 208 are legally permitted to provide services to inmate 212. Some examples of registration information include authentication information, authorization information, biographical information, geographical regions serviced by the inmate agent, inmate agent preferences, agent device information, contact information, pricing information, billing information, and/or payment information.

As described in detail with respect to FIG. 1, the inmate agents 208 use the agent devices 206 to log into the presence service based 226. Once the agent devices 206 are logged into the presence based service 226, the agent devices 206 periodically send the presence statuses 248 to the presence based service 226, the presence statuses 248 indicating to the presence based service 226 the availability of the inmate agents 208 to assist the inmates 212.

For example, the agent device 206(1) sends the presence status 248(1) indicating that the inmate agent 208(1) would like to remain logged into the presence based service 226. Upon receipt of the presence status 248(1), the presence based service 226 notifies the kiosk devices 204 that the inmate agent 208(1) is available to assist the inmates 212. For instance, the presence based service 226 sends inmate agent information 250 to the kiosk devices 204 indicating that the inmate agent 208(1) is available to assist the inmates 212. As another example, the agent device 206(1) sends the presence status 248(1) indicating that the inmate agent 208(1) is logging out of the presence based service 226. Upon receipt of the presence status 248(1), the presence based service 226 notifies the kiosk devices 204 that the inmate agent 208(1) is no longer available to assist the inmates 212. In some embodiments, the presence based service 226 notifies the kiosk devices 204 that the inmate agent 208(1) is no longer available to assist the inmates 212 by withholding information related to the inmate agent 208(1) from the inmate agent information 250. In some other embodiments, the presence based service 226 explicitly indicates that the inmate agent 208(1) is no longer available within the inmate agent information 250.

Further, as described in detail above, the presence based service 226 facilitates the initialization of secure out of band communication channels 252(1)-(N) between the client devices. Further, once the out-of-band communication channels 252 are established between client devices, the client devices may electronically communicate independent of the presence based service 226. For example, the kiosk device 204 communicates with the agent device 206(1) via the out of band communication channel 252(1), thereby allowing the inmate 212(1) and the inmate agent 208(1) to communicate in confidence. Additionally, or alternatively, the client devices can communicate via the presence based service 226. For instance, in some embodiments, client devices can communicate via communication channels established and maintained by the presence based service 226. In some examples, the communication channels of the presence based service 226 are encrypted end to end to protect communication via the communication channels of the presence based service 226 from eavesdropping.

The inmate agent information 228 includes information about the inmate agents 208 in the video kiosk inmate system 200. As illustrated in FIG. 2, the inmate agent information 228 includes inmate agent profiles 254 corresponding to the inmate agents 208 providing services within the video kiosk inmate system 200. For example, the first inmate agent profile 254(1) is associated with the first inmate agent 208(1), the nth inmate agent profile 254(N) is associated with the nth inmate agent 208(N), and so forth. In certain embodiments, the inmate agent profiles 254 include authentication information, encryption information, authorization information, biographical information, geographical regions serviced by the associated inmate agent, executed service agreements, existing inmate clients, agent device information, contact information, user reviews, an account balance, pricing information, billing information, and/or payment information.

The inmate information 230 includes information about the inmates 212 confined to inmate booking environments 220 within the video kiosk inmate system 200. As illustrated in FIG. 2, the inmate information 230 includes inmate profiles 256 corresponding to the inmates 212. For example, the first inmate profile 256(1) is associated with the first inmate 212(1), the nth inmate profile 256(N) is associated with the nth inmate 212(N), and so forth. In certain embodiments, the inmate profiles 256 include authentication information, biometric information, encryption information, inmate device information, executed service agreements, personal contact information, emergency contact information, historic location information, booking information, and/or criminal history information from one or more of a jail management system (JMS), an offender management system (OMS), a public database containing information on the inmates 212.

As shown in FIG. 2, the kiosk management server 202 further includes the payment service 232 that processes payments within the video kiosk inmate system 200. In some embodiments, the payment service 232 processes payments to the inmate agents 208 from inmates 212 using the kiosk devices 204. For example, the kiosk device 204(1) sends a payment communication 258 to the payment service 232, the payment communication 258 representing the payment of a retainer by the inmate 212(1) to the inmate agent 208(1). Further, the payment service 232 transfers the payment amount to the account balance of the inmate agent 208(1). As another example, the inmate device 210(1) sends a payment communication 258 to the payment service 232, the payment communication 258 representing payment for bail bondsman services provided by the inmate agent 208(1) to the inmate 212(1). Further, the payment service 232 transfers the transfer the payment amount to the account balance of the inmate agent 208(1). In some other embodiments, the payment service 232 processes payments from the inmate agents 208 on behalf of the inmates 212. For example, the agent device 206(1) sends the payment communication 258 to the payment service 232, the payment communication representing the posting of a bond by the inmate agent 208(1) on behalf of the inmate 212(1). Further, the payment service 232 transfers the payment amount to an account associated with the jurisdictional entity responsible for release of the inmate 212(1). Additionally, or alternatively, the payment service 232 can receive a payment communication 258 from the inmate associate device 214 associated with the inmate associate 216 (e.g., a family member or friend of an inmate 212) on behalf of the inmate 212(1).

In some embodiments, the security module 224 authenticates the inmate 212(1) as the current user of the kiosk device 204. Additionally, the payment service 232 determines a bail amount set for release of the inmate 212(1), and/or a fine amount levied against the inmate 212(1) based on the inmate profile 256(1). Further, the payment service 232 sends a payment request 260 to the kiosk device 204 in the amount of the bail amount, and/or the fine amount levied against the inmate 212(1). In addition, the payment service receives the payment communication 258 corresponding to the payment request 260, and verifies the payment information provided in the payment communication 258. Upon verification of the payment information, the payment service 232 may notify the proper authorities that one or more conditions for release have been met. For example, the payment service 232 may send a communication to an operator of the inmate booking environment 220 indicating that one or more conditions for release have been met. As another example, the payment service 232 may update the inmate information 230 (e.g., a jail management system (JMS), an offender management system (OMS), a public database containing information on prison inmates) to indicate that one or more conditions for release have been met.

The tracking initialization module 234 configures a location monitoring device to collect location information 262 corresponding to an inmate 212, and send the location information 262 to the tracking module 236. Some examples of the location monitoring devices include the inmate devices 210 and the tracking device 218. In some instances, the tracking device 218 is provided by the kiosk device 204. In some other instances, the tracking device 218 is provided by an operator of the inmate booking environment 220.

In some embodiments, the inmate 212(1) may be released under a condition that the inmate 212(1) periodically provide the location information 262 to the kiosk management server 202, and/or remain within a predetermined geographic region for a predetermined period of time. In some other embodiments, the inmate 212(1) may agree to provide location information 262 to the kiosk management server 202, and/or remain within a predetermined geographic region for a predetermined period of time under the terms of an agreement with the inmate agent 208(1). For example, the inmate 212(1) may agree to provide the location information 262 to the inmate agent 208(1) under the terms of an agreement for the inmate agent 208(1) to post bond for the inmate 212(1).

Further, the tracking initialization module 234 manages the installation of a location monitoring application 264 on the location monitoring devices. For example, the tracking initialization module 234 verifies the integrity of the inmate device 210(1) via the security module 224. Further, the tracking initialization module 234 sends an installation executable 266 corresponding to the location monitoring application 264 to the inmate device 210(1). Additionally, or alternatively, the kiosk device 204 may provide the installation executable 266 corresponding to the location monitoring application 264 to the inmate device 210(1).

Further, the tracking initialization module 234 verifies installation of the location monitoring application 264 on the inmate device 210(1). In some embodiments, the location monitoring application 264 sends an installation confirmation 268 to the tracking initialization module 234. Upon receipt of the installation confirmation 268, the tracking initialization module 234 updates the inmate profile 256(1) to include a mapping of the inmate 212(1) to an identifier of the location monitoring application 264 on the inmate device 210(1). Additionally, the tracking initialization module 234 updates the inmate agent profile 254(1) to include a mapping of the inmate agent 208(1) to an identifier of the location monitoring application 264 on the inmate device 210(1). In some embodiments, the mapping of the inmate agent 208(1) and the identifier of the location monitoring application 264 provides the inmate agent 208(1) access to the location information 262 received from the location monitoring application 264.

In some embodiments, the tracking initialization module 234 determines a geographic region associated with the inmate 212(1) based on the location information 262. For example, the inmate device 210(1) sends the location information 262 to the tracking initialization module 234. Further, the location information 262 may include historical location data collected by the inmate device 210(1), the historical location data indicating locations commonly frequented by the inmate 212(1) (e.g., home, work, school, local stores, etc.). Further, the tracking initialization module 234 determines a geographic region that includes the locations commonly frequented by the inmate 212(1).

In some embodiments, the tracking initialization module 234 determines the geographic region by generating a density map or heat map representing locations historically frequented by the inmate 212(1), and creating a boundary around the densest areas. In some other examples, the geographic region is further limited by a geographic region (e.g., city of residence, county of residence, town of residence, state of residence, etc.) associated with the inmate 212(1). Additionally or, alternatively, the size of the geographic region may be modified based on the inmate agent profile 254(1) and/or inmate profile 256(1). For example, the inmate agent profile 254(1) may indicate that the inmate agent 208(1) has a preference for posting bond for inmates 208(1) that will limit their travel upon release to an area within a predetermined distance from a place of business of the inmate agent 212(1). As such, the geographic region is modified to ensure compliance with the preference of the inmate agent 208(1). As another example, the geographic region may be limited by a charge included in the inmate profile 256(1). For instance, the kiosk management server may reduce the size of the geographic region if the inmate 212(1) has committed a violent crime.

Additionally, in some embodiments, the tracking module 236 uses the geographic region to monitor the inmate 212(1) upon release.

Once the location monitoring application 264 is installed on the inmate device 210(1), the location monitoring application 264 sends the location information 262 to the tracking module 236 of the kiosk management server 202. Upon receipt of the location information 262, the tracking module 236 sends the location information 262 to the agent device 206(1) under the terms of a service agreement between the inmate 212(1) and the inmate agent 208(1). In some embodiments, the location information 262 includes a device identifier 270 corresponding to the inmate device 210(1), and a location identifier 272. As used herein, a location identifier 272 includes a coordinate, positional descriptor, or any other information capable of identifying a location of the inmate device 210(1).

In some embodiments, the tracking module 236 generates a graphical representation of the location of inmate device 210(1), and sends the graphical representation to the agent device 206(1) within the location information 262. In some instances, the graphical representation includes a map of a geographical region corresponding to the location identifier 272, and a graphical indicator corresponding to the location of the inmate device 210(1) within the geographical region.

Additionally, in some embodiments, the tracking module 236 monitors whether the inmate device 210(1) remains in the geographic region determined by the tracking initialization module 234. Further, if the inmate device 210(1) is detected outside of the geographic region, the tracking module 236 sends a warning communication 274 to the agent device 206(1) indicating that the inmate device 210(1) is currently outside of the geographic region. In some instances, the tracking module 236 sends the warning communication 274 to the agent device 206(1) based on the tracking module 236 determining that the inmate device 210(1) has been detected outside of the geographic region for a period of time longer than a predetermined amount. In some other instances, the tracking module 236 sends the warning communication 274 to the agent device 206(1) based on the tracking module 236 determining that the inmate device 210(1) has been detected more than a predetermined distance outside of the geographic region. By sending the warning communication 274 to the agent device 206(1), the kiosk management service 204 provides the inmate agent 208(1) an opportunity to communicate with the inmate 212(1) during a potential attempt to abscond, and/or locate the inmate 212(1) during a potential attempt to abscond. Additionally, or alternatively, the tracking module 236 notifies a law enforcement agency of the location of the inmate 212(1). For instance, the tracking module 236 sends the warning communication 274 to a device associated with a law enforcement agency and/or law enforcement officer.

Further, in some embodiments, the tracking module 236 verifies that the inmate 212(1) is currently in possession of the inmate device 210(1). For example, the inmate 212(1) may leave the inmate device 210(1) within the geographic region and travel to another geographic region as a means of circumventing the location monitoring. Further, circumvention of location monitoring may be indicative of an attempt by the inmate 212(1) to abscond, and risks the inmate agent 208(1) being responsible for paying the full bond amount.

As such, the tracking module 236 sends a possession request 276 to the inmate device 210(1). In response, the inmate device 210(1) sends a possession response 278 to the tracking module 236. In some embodiments, the possession response 278 includes activity information of the inmate device 210(1) that can be used to determine that the inmate device 210(1) has not been dispossessed or abandoned by the inmate 212(1). In some other embodiments, the possession response 278 includes authentication information, such as facial recognition, fingerprint identification information, palm print identification information, iris recognition information, retina recognition information, voice recognition information, cryptographic hashes, credentials, secrets, passwords, etc. Further, the possession response includes a device identifier 270 that identifies the inmate device 210(1), and a timestamp 280 representing the time the possession information was captured by the inmate device 210(1).

Upon receipt of the possession response 278, the tracking module 236 verifies that the inmate 212(1) is in possession of the inmate device 210(1). In some embodiments, the tracking module 236 uses the activity information (e.g., data collected by sensors of the inmate device 210(1) to determine that that inmate 212(1) is currently using the inmate device 210(1). For example, the activity data may reveal that one or more applications of the inmate device 210(1) have been recently used by the inmate 212(1), or recent use of a telephonic function of the inmate device 210(1). In some other embodiments, the tracking module 236 verifies that the authentication information provided in the possession response 278 is valid based on at least one of the security module 224 and the inmate profile 256(1). For instance, the security module 224 compares the possession response 278 to authentication information stored in the inmate profile 256(1) to determine whether the inmate 212(1) is in possession of the inmate device 210(1).

As an example, in response to receipt of the possession request 276, the inmate device 210(1) captures facial data using a biometric sensor and sends the facial data to the tracking module 236 in the possession response 278. Further, the security module 224 compares a number of the facial data points included in the possession response 278 to a number of facial data points included in the inmate profile 256(1) using machine learning and/or pattern recognition techniques. Facial data included but is not limited to facial data information representing the characteristics of a person's face such as distances between eyes, nose, and mouth, and shapes of the eyes, nose, mouth, jaw. Facial data also includes facial information created from, for example, a hash function, of the facial data points. If the facial data points in the possession response 278 match the facial data points in the inmate profile 256(1) within a predetermined threshold, the tracking module 236 determines that the inmate 212(1) is currently in possession of the inmate device 210(1).

If the tracking module determines that the inmate is not in possession of the inmate device 210(1), the tracking module 236(1) sends the warning communication 274 to the agent device 206(1) indicating that the inmate 212(1) may no longer be in possession of the inmate device 210(1). Further, if the tracking module does not receive the possession response 278, or the timestamp 280 indicates that the possession response 278 does not meet predetermined freshness requirements, the tracking module 236 sends the warning communication 274 to the agent device 206(1) indicating that the inmate 212(1) may no longer be in possession of the inmate device 210(1).

As shown in FIG. 2, the kiosk devices 204 include a kiosk application 282, a payment interface 284, input/output (I/O) devices 286 (e.g., display, microphone, camera, biometric sensors, etc.), and a communication interface 288. In some embodiments, the inmates 212 utilize the kiosk application 282 to receive assistance from the inmate agents 208. For example, as described with respect to FIG. 1, the inmates 212 utilize the kiosk device 204 to view the agent information 228 via the display 290, select inmate agents 208 via the I/O devices 286, and establish a communication channel (e.g., out of band communication channel 252) with the inmate agent devices 206 via the communication interface 288.

Further, the kiosk application 282 identifies the inmates 212 using the kiosk devices 204. For example, the kiosk application 282 collects authentication information 292 from the inmate 212(1) using the I/O devices 286(1) of the kiosk device 204. Further, the kiosk application 282 sends an inmate information request 294 to the kiosk management server 202, wherein the inmate information request 294 includes the authentication information 292 and an inmate identifier 296 of the inmate 212(1). Upon receipt of the inmate information request 294, the security module 224 authenticates the inmate 212(1) by comparing the authentication information 292 with inmate information 230 (i.e., inmate profile 256(1)) associated with the inmate identifier 296. Further, the kiosk management server 202 sends an inmate information response 298 to the kiosk device 204. In some examples, the inmate information response 298 includes the charges brought against the inmate 212(1), a bail amount set for release of the inmate 212(1), and/or a fine amount levied against the inmate 212(1).

In some embodiments, upon receipt of the inmate information response 298, the kiosk device 204 presents the inmate 212(1) with the ability to share the inmate information response 298 with the inmate agents 208. For example, if the inmate 212(1) and the inmate agent 208(1) have executed a service agreement, the inmate 212 may authorize the kiosk device 204 or the kiosk management server 202 to send the inmate information response 298 to the inmate agent 206(1).

In some other embodiments, the inmate 212(1) can make a payment based upon the inmate information response 298. For example, the inmate information response 298 may indicate that inmate 212(1) has a fine and/or bond amount associated with release of the inmate 212(1) from the inmate booking environment 220. Further, the kiosk device 204 may present a graphical user interface via the I/O device 286(1) that instructs the inmate 212(1) on payment of the fine and/or bond.

Additionally, the inmate 212(1) may use the payment interface 284 for payment of the fine and/or bond. For example, the inmate 212(1) may use a payment card or payment card information to make payment of the fine and/or bond via the payment interface 284. As described in detail above, in some embodiments, the kiosk device 204 sends the payment communication 258 to the kiosk management server 202 in response to receipt of payment from the inmate 212(1). Further, the inmate 212(1) may use the payment interface 284 to pay for services rendered by the inmate agent 208(1) or future services to be rendered by the inmate agent 208(1). For example, the inmate 212(1) may use a payment card or payment card information to make payment of a service fee to the inmate agent 208(1). As described in detail above, in some embodiments, the kiosk device 204 sends the payment communication 258 to the kiosk management server 202 in response to receipt of payment from the inmate 212(1). Additionally, or alternatively, the kiosk application 282 may also present a payment interface to the inmate associate device 214 via the communications network 222 for payment of a fine, bond, and or service fee.

Figure 3:
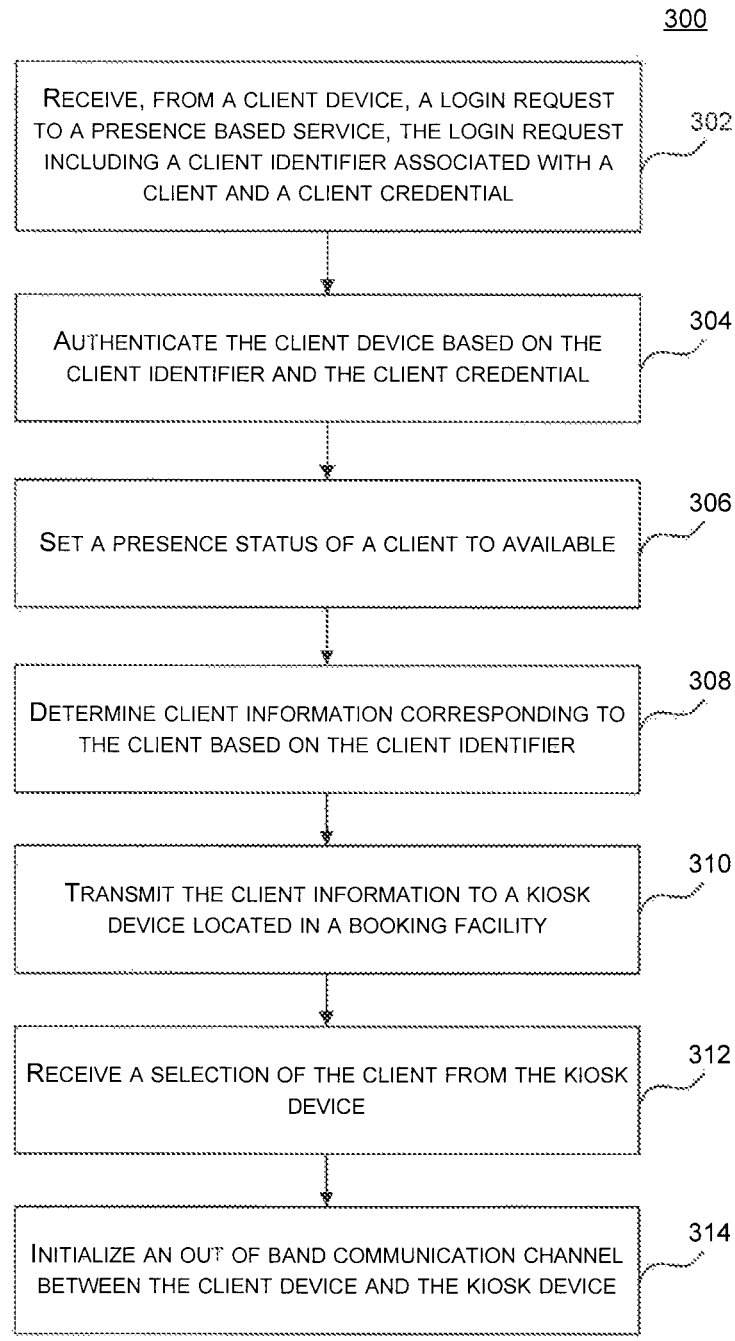
FIG. 3 is a flow diagram illustrating an example process for providing inmate assistance via a video kiosk inmate system, according to exemplary embodiments.

FIG. 3 illustrates a process 300 for providing inmate assistance via a video kiosk inmate system, according to some implementations. The process 300 is illustrated as a collection of blocks in a logical flow graph, which represent a sequence of operations that can be implemented in hardware, software, or a combination thereof. The blocks are referenced by numbers 302-314. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 302, a kiosk management server receives, from a client device, a login request to a presence based service, the login request including a client identifier associated with a client and client credentials. For example, the agent device 106 sends the login request 118 to the presence based service 116 via the communication network 114. In some embodiments, the login request includes the client identifier 120 and the client credential 120.

At 304, the kiosk management server authenticates the client device based on the client identifier and the client credential. For example, upon receipt of the login request 118, the presence based service 116 authenticates the agent device 106 based on the client identifier 120 and the client credential 122.

At 306, the kiosk management server sets a presence status of a client to available. For example, if the agent device 106 successfully authenticates to the presence based service 116, the agent device 106 is logged into the presence based service 116.

At 308, the kiosk management server determines client information corresponding to the client based on the client identifier. For example, the kiosk management server 20 202 identifies the inmate agent profile 254(1) corresponding to the inmate agent associated with the client identifier 120.

At 310, the kiosk management server transmits the client information to a kiosk located in a booking facility. For example, the kiosk management server 102 sends inmate agent information 124 associated with the inmate agent 108 to the kiosk device 104 via the communication network 114. In certain embodiments, upon receipt of the inmate agent information 124, the kiosk device 104 presents a graphical representation of the inmate agent information 124 via a display interface of the kiosk device 104.

At 312, the kiosk management server receives a selection of the client from the kiosk. For example, the inmate 112 may view the inmate agent information 124 via the kiosk device 104, and select to communicate with the inmate agent 108. In response, the kiosk device 104 sends the inmate agent selection 128 to the kiosk management server 102 via the communication network 114, wherein the inmate agent selection 128 indicates that the inmate 112 requests to communicate with the inmate agent 108.

At 314, the kiosk management server initializes an out of band communication channel between the client device and the kiosk. For example, the kiosk management server 102 establishes the out of band communication channel 130 between the agent device 106 and the kiosk device 104.

In some embodiments, the kiosk management server 102 assists the kiosk device 104 and agent device 106 in establishing the out of band communication channel 130 by facilitating an encryption key exchange. For instance, the kiosk management server 102 may provide encryption information (e.g., certificates, encryption keys, secrets, etc.) to the kiosk device 104 and agent device 106 that the kiosk device 104 and agent device 106 employ in a handshake protocol to establish a symmetric encryption key for transmission of data over the out of band communication channel 130.

Figure 4:
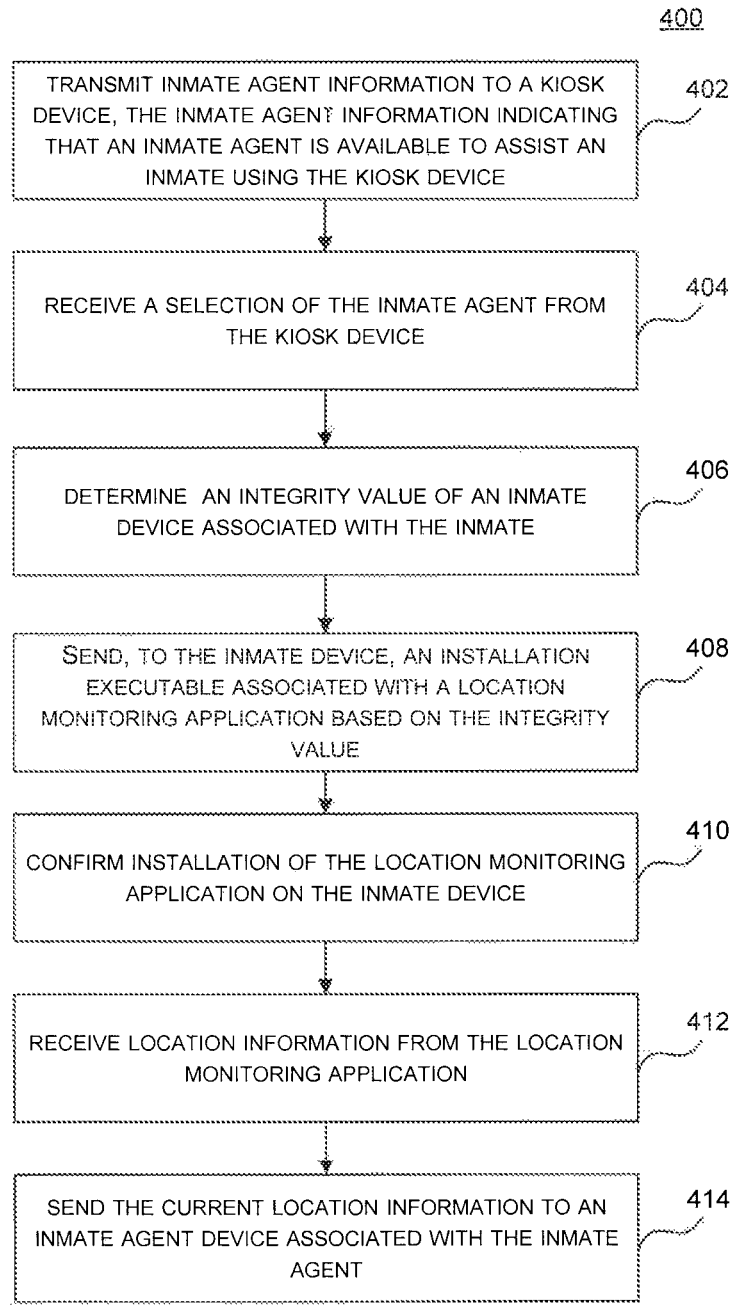
FIG. 4 is a flow diagram illustrating an example process for providing inmate assistance via a video kiosk inmate system, according to exemplary embodiments.

FIG. 4 illustrates a process 400 for providing inmate assistance via a video kiosk inmate system, according to some implementations. The process 400 is illustrated as a collection of blocks in a logical flow graph, which represent a sequence of operations that can be implemented in hardware, software, or a combination thereof. The blocks are referenced by numbers 402-416. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 402, the kiosk management server transmits the client information to a kiosk located in a booking facility. For example, the kiosk management server 202 sends contents of the inmate agent profile 254(1) associated with the inmate agent 208(1) to the kiosk device 204(1). In certain embodiments, upon receipt of the contents of the inmate agent profile 254(1), the kiosk device 204 presents a graphical representation of the contents of the inmate agent profile 254(1) via a display interface of the kiosk device 204(1).

At 404, the kiosk management server receives a selection of the client from the kiosk. For example, the inmate 212(1) may view the contents of inmate agent profile 254(1) via the kiosk device 204(1), and request the assistance of the inmate agent 208(1). In response, the kiosk device 204(1) sends an inmate agent selection (e.g., the inmate agent selection 128) to the kiosk management server.

At 406, a kiosk management server determines the integrity value of an inmate device associated with an inmate. In some embodiments, the inmate agent 208(1) and the inmate 212(1) enter an agreement for the inmate agent 208(1) to post bond for the inmate 212(1), and the inmate 212(1) to periodically provide the location information 262 to the inmate agent 208(1) via the location monitoring application 264. Further, the kiosk management server 202 facilitates location monitoring by managing the installation of the location monitoring application 264 on the inmate device 210(1).

For example, the kiosk management server 202 sends an integrity request 238 to the inmate device 210(1). In response, the inmate device 210(1) sends an integrity response to the kiosk management server 202. Upon receipt of the integrity response 240, the security module 224 verifies the integrity of the inmate device 210 based upon the integrity response 240. Further, in some embodiments, the integrity response 240 includes proof information 242 that can be used to determine the integrity of the inmate device 210(1).

At 408, the kiosk management server transmits, to the inmate device, an installation executable associated with a location monitoring application based on the integrity value.

For example, the tracking initialization module 234 sends an installation executable 266 corresponding to the location monitoring application 264 to the inmate device 210(1). Additionally, or alternatively, the kiosk device 204 may provide the installation executable 266 to the inmate device 210(1).

At 410, the kiosk management server confirms installation of the location monitoring application on the inmate device. For example, the tracking initialization module 234 receives the installation confirmation 268 from the location monitoring application 264. Upon receipt of the installation confirmation 268, the tracking initialization module 234 updates the inmate profile 256(1) to include a mapping of the inmate 212(1) to an identifier of the location monitoring application 264 on the inmate device 210(1).

At 412, the kiosk management server associates the inmate agent with the location monitoring application on the inmate device. For example, the kiosk management server 202 modifies the inmate agent profile 254(1) to indicate that the inmate agent 208(1) is authorized to receive location information 262(1) received from the location monitoring application 264 installed on the inmate device 210(1).

At 414, the kiosk management server receives current location information from the location monitoring application. For example, after the inmate 212(1) is released from the inmate booking environment 220, the tracking module 236 receives the location information 262(1) from the location monitoring application 264 as the inmate 212(1) travels with the inmate device 210(1). In some embodiments, the location information 262 includes a device identifier 270 corresponding to the inmate device 210(1) (e.g., the identifier of the installation of the location monitoring application 264 on the inmate device 210(1)), and a location identifier 272 that identifies a location of the inmate device 210(1).

At 416, the kiosk management server transmits the current location information to an inmate agent device associated with the inmate agent. For example, the tracking module 236 sends the inmate agent device 206(1) the location information 262 based upon the association between the inmate agent 208(1) and the location monitoring application 264 installed on the inmate device 210(1).

Figure 5B:
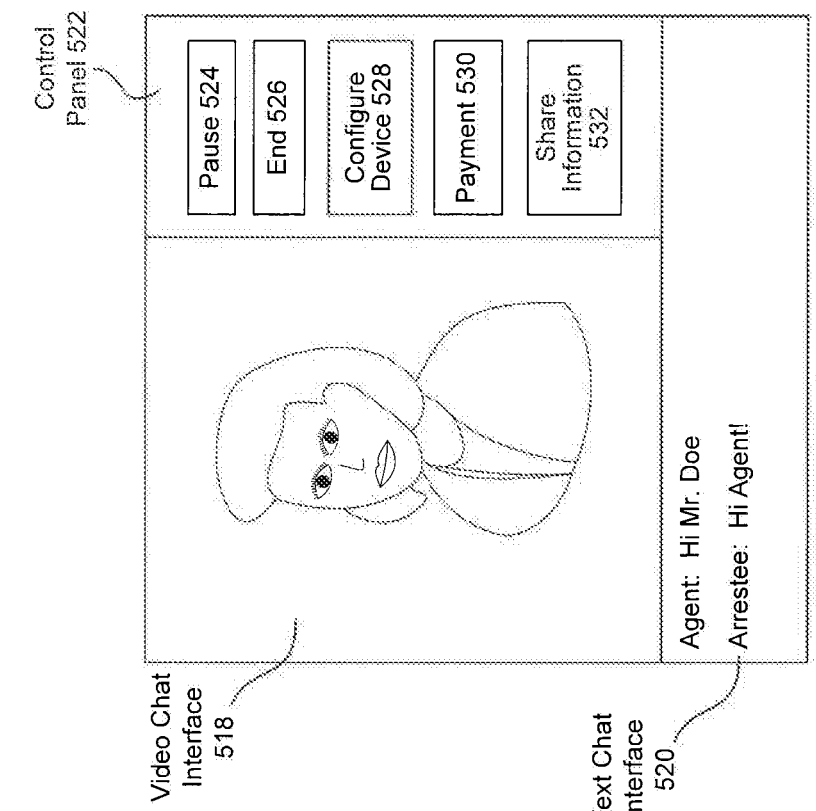
FIGS. 5A-5B illustrate an example graphical user interface for providing a video kiosk inmate system, according to exemplary embodiments.
Figure 5A:
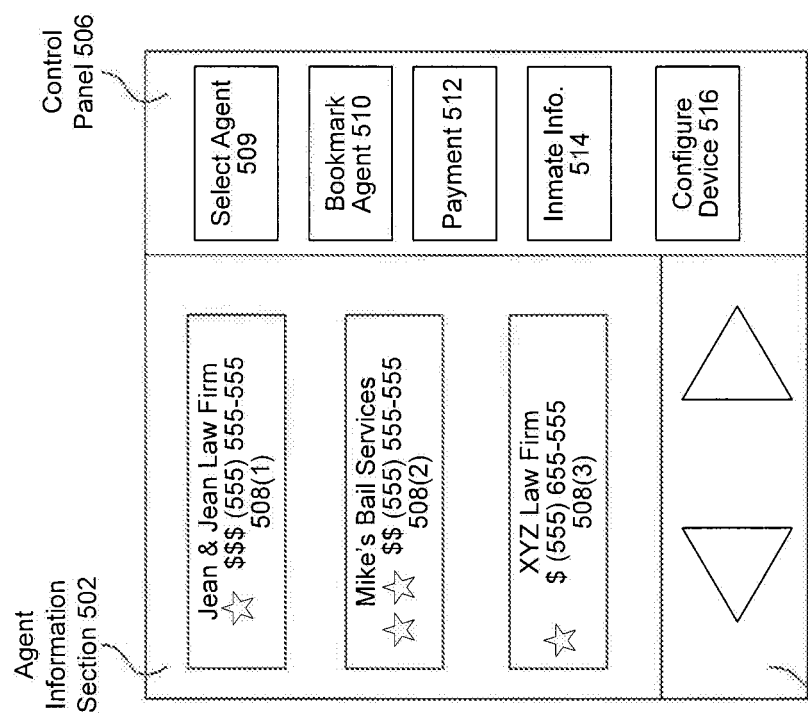

FIG. 5A illustrates an example graphical user interface 500, displayed on a kiosk device, for providing inmate agent information to an inmate, according to exemplary embodiments. As shown in FIG. 5A, the graphical user interface 500 includes an agent information section 502, a navigation bar 504, and a control section 506. The agent information section 502 includes agent information 508 (e.g., the inmate agent information 120) corresponding to inmate agents (e.g., the inmate agents 108) within the video kiosk inmate assistance system. In some embodiments, the agent information 508 includes a name of an inmate agent, pricing information of an inmate agent, user reviews corresponding to an inmate agent, contact information corresponding to an inmate agent, and any other information that describes the services offered by an inmate agent to an inmate. Further, individual inmate agents are associated with particular agent information. For example, a first inmate agent is associated with the agent information 508(1); an nth inmate agent is associated with the agent information 508(N), and so forth.

Further, the navigation bar 504 provides functionality for browsing through the available agent information 508 within the video kiosk inmate assistance system. In some embodiments, the agent information 508 is ranked or filtered according to one or more attributes of the corresponding inmate agents. For example, inmate agents having experience or good reviews with respect to a criminal charge associated with the inmate may be ranked higher. As another example, inmate agents offering services in a geographic region associated with the inmate may be ranked higher.

As further shown in FIG. 5A, the control section 506 includes a select agent control 509, a bookmark agent control 510, a payment control 512, an inmate information control 514, and a configure device control 516. When the inmate selects the select agent control 508, the kiosk device 204 (not shown in FIG. 5A) sends the information agent selection 124 (not show in FIG. 5A) to the kiosk management server 102 (not show in FIG. 5A). When an inmate selects the bookmark agent control 510, the kiosk device 204 adds a highlighted inmate agent to a list of favorited inmate agents. Further, the kiosk device 204 can filter the inmate agent information 508 by the list of favorited inmate agents. When an inmate selects the payment control 512, the kiosk device 204 displays another graphical user interface with functionality for payment of a bond or fee associated with the conditions for release of the inmate. Additionally, the kiosk device 204 may display another graphical user interface with functionality for payment of services provided by an inmate agent. When an inmate selects the inmate information control 514, the kiosk device 204 displays another graphical user interface with information about the terms and conditions of the inmate's arrest (e.g., a bond or fine amount associated with the conditions of the inmate release). When an inmate selects the configure device control 416, the kiosk device 204 displays another graphical user interface with functionality for configuring location monitoring via a device associated with the inmate.

FIG. 5B illustrates an example graphical user interface 500, displayed on a kiosk device, for providing a communication interface to an inmate, according to exemplary embodiments. As shown in FIG. 5B, the graphical user interface 500 includes a video chat interface 518, a text chat interface 520, and a control panel 522. The video chat interface 518 provides an interface for audio visual communications between the inmate and an inmate agent. In some embodiments, the audio visual communications are transmitted over an out of band communication channel (e.g., the out of band communication channels 252), as described herein. The text chat interface 520 provides an interface for textual communications with an inmate agent. In some embodiments, the text communications are transmitted over an out of band communication channel (e.g., the out of band communication channels 252), as described herein.

As further shown in FIG. 5B, the control section 522 includes a pause control 524 for placing communication with an inmate agent on hold, an end control 526 for terminating communication with an inmate agent, a configure device control 516, a payment control 512, and a share information control 526. When an inmate selects the share information control 514, the kiosk device 204 requests that that the kiosk management server 202 sends inmate information (e.g., the inmate information response 298) to the inmate agent.

Figure 6:
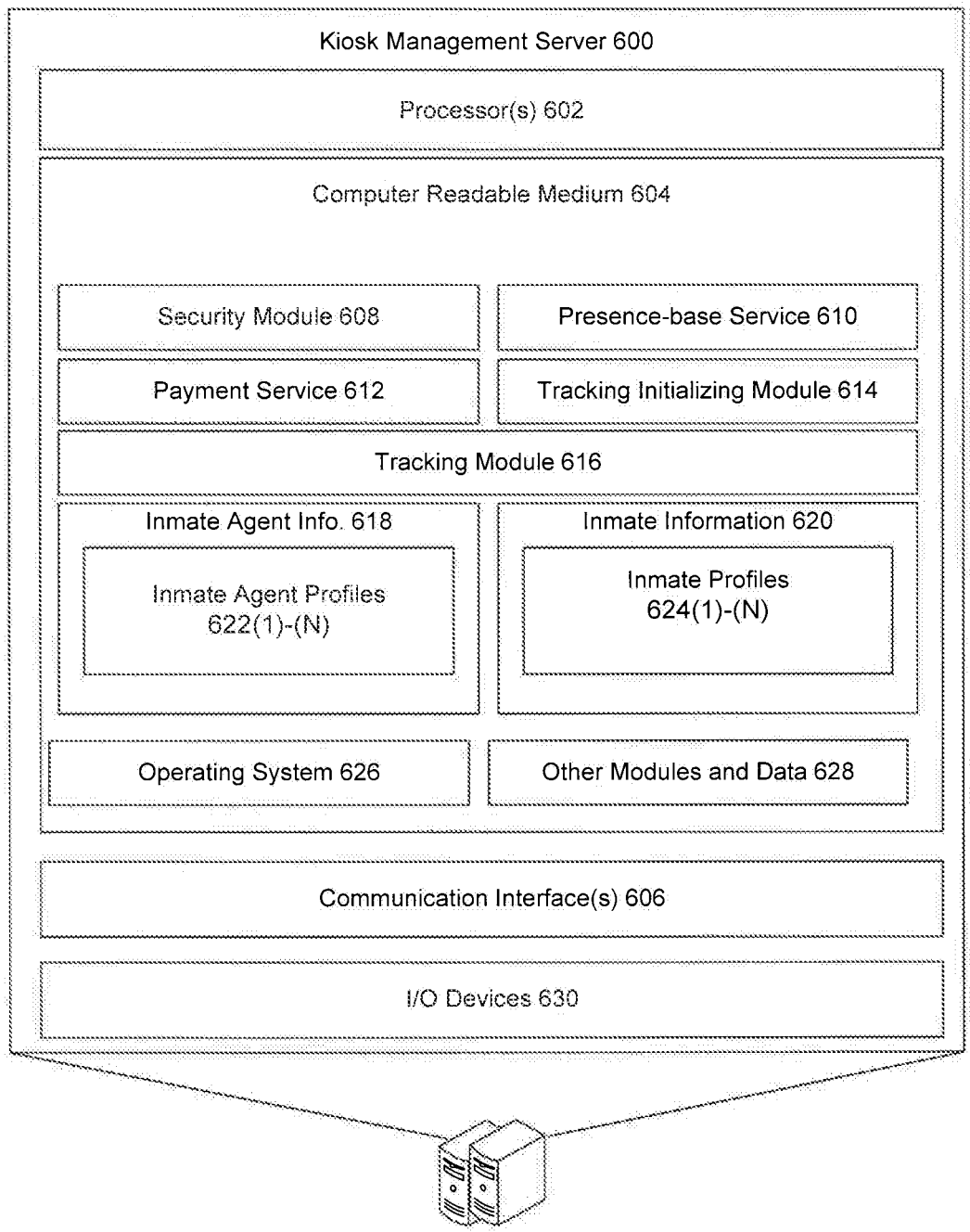
FIG. 6 illustrates a block diagram of select components of an example kiosk management server, according to exemplary embodiments.

FIG. 6 illustrates select components of the kiosk management server 500, such as kiosk management server 104 and kiosk management server 202. The kiosk management server 600 includes one or more servers or other types of computing devices that may be embodied in any number of ways. For instance, the modules, other functional components, and data may be implemented on a single server, a cluster of servers, a server farm or data center, a cloudhosted computing service, and so forth, although other computer architectures may additionally or alternatively be used.

Further, while the figures illustrate the components and data of the kiosk management server 600 as being present in a single location, these components and data may alternatively be distributed across different computing devices and different locations in any manner. Consequently, the functions may be implemented by one or more computing devices, with the various functionality described above distributed in various ways across the different computing devices. Multiple kiosk management servers 600 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, the kiosk management server 600 includes one or more processors 602, one or more computer-readable media 604, and one or more communication interfaces 606. Each processor 602 is a single processing unit or a number of processing units, and may include single or multiple computing units or multiple processing cores. The processor(s) 602 can be implemented as one or more microprocessors, microcomputers, microcontrollers, digital signal processors, central processing units, state machines, logic circuitries, and/or any devices that manipulate signals based on operational instructions. For instance, the processor(s) 602 may be one or more hardware processors and/or logic circuits of any suitable type specifically programmed or configured to execute the algorithms and processes described herein. The processor(s) 602 can be configured to fetch and execute computer-readable instructions stored in the computer-readable media 604, which can program the processor(s) 602 to perform the functions described herein.

The computer-readable media 604 include volatile and nonvolatile memory and/or removable and non-removable media implemented in any type of technology for storage of information, such as computer-readable instructions, data structures, program modules, or other data. Such computer-readable media 604 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the kiosk management server 600, the computer-readable media 604 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 604 is used to store any number of functional components that are executable by the processors 602. In many implementations, these functional components comprise instructions or programs that are executable by the processors and that, when executed, specifically configure the one or more processors 602 to perform the actions attributed above to the kiosk management server 600. In addition, the computer-readable media 604 store data used for performing the operations described herein.

In the illustrated example, the functional components stored in the computer-readable media 604 include a security module 608, a presence based service 610, a payment service 612, a tracking initialization module 614, and a tracking module 616. Further, the computer-readable media 604 include inmate agent information 618 and inmate information 620. In addition, the inmate agent information 618 includes inmate agent profiles 622, and the inmate information 620 includes inmate device profiles 624.

Additional functional components stored in the computer-readable media 604 include an operating system 626 for controlling and managing various functions of the kiosk management server 600. The kiosk management server 600 also include or maintain other functional components and data, such as other modules and data 628, which include programs, drivers, etc., and the data used or generated by the functional components. Further, the kiosk management server 600 includes many other logical, programmatic and physical components, of which those described above are merely examples that are related to the discussion herein.

The communication interface(s) 606 include one or more interfaces and hardware components for enabling communication with various other devices, such as the kiosk devices 104 and 204, the agent device 106, the agent devices 206, the inmate device 110, the inmate devices 210, or other computing devices, over the network(s) 114 and 222. For example, communication interface(s) 606 facilitate communication through one or more of the Internet, cable networks, cellular networks, wireless networks (e.g., Wi-Fi, cellular) and wired networks. As several examples, the kiosk management server 600 and the kiosk device 204 communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCM-CIA slot and card, etc.

The kiosk management server 600 may further be equipped with various input/output (I/O) devices 630. Such I/O devices include a display, various user interface controls (e.g., buttons, joystick, keyboard, mouse, touch screen, etc.), audio speakers, connection ports and so forth.

Figure 7:
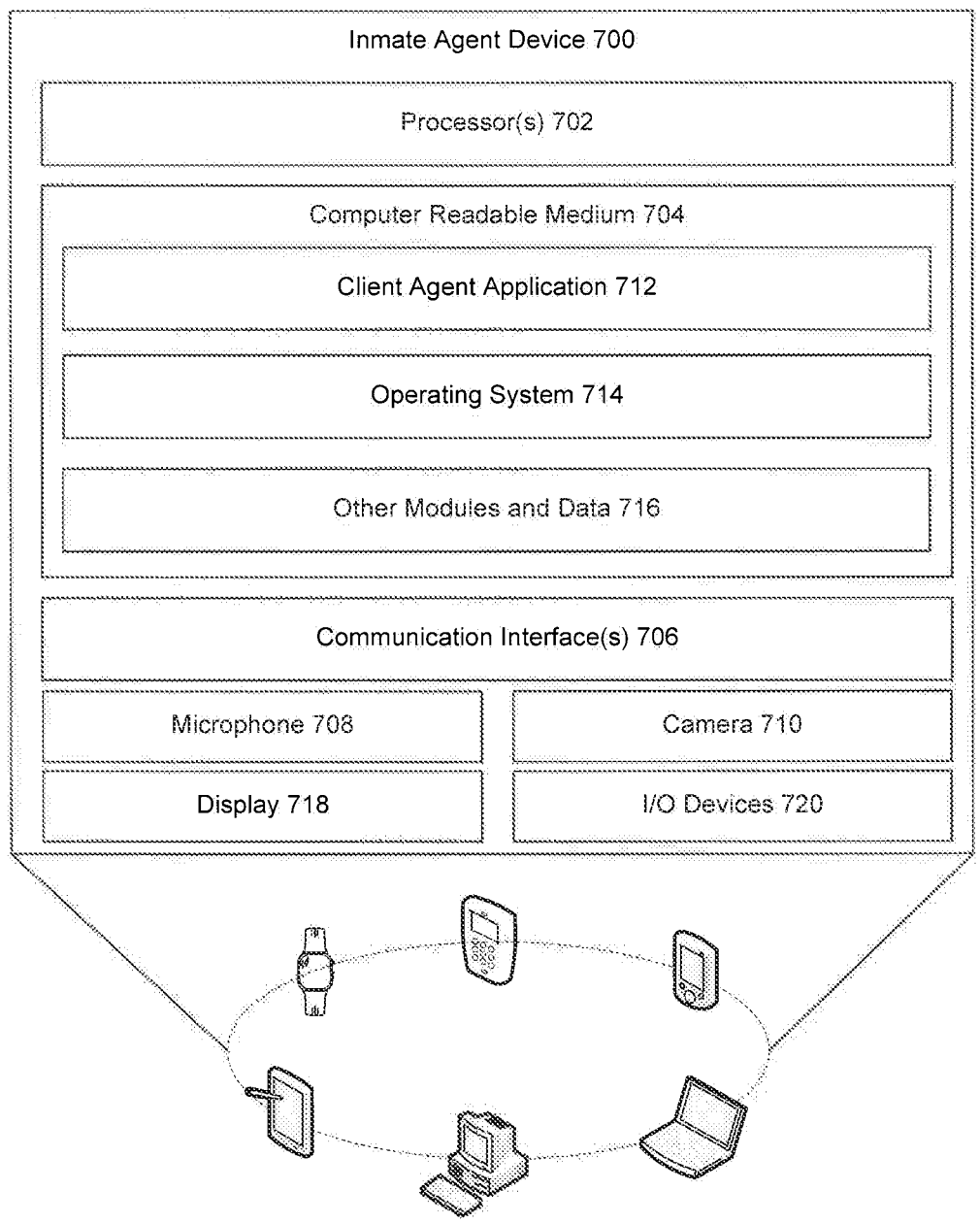
FIG. 7 illustrates a block diagram of select components of an example agent device, according to exemplary embodiments.

FIG. 7 illustrates select example components of the inmate agent device 700 (e.g., the agent device 106 and the agent devices 206) that implements the functionality described above, according to an exemplary embodiment. The inmate agent device 700 may be any of a number of different types of personal computing devices. Some examples of the inmate agent device 700 include smart phones and mobile communication devices, tablet computing devices, desktops, laptops, netbooks and other portable computers, wearable computing devices, and any other portable device capable of sending communications and performing the functions according to the techniques described herein.

In the illustrated example, the inmate agent device 700 includes one or more processors 702, one or more computer-readable media 704, one or more communication interfaces 706, a microphone 708, and a camera 710. Each processor 602 is a single processing unit or a number of processing units, and may include single or multiple computing units or multiple processing cores. The processor(s) 702 can be implemented as one or more microprocessors, microcomputers, microcontrollers, digital signal processors, central processing units, state machines, logic circuitries, and/or any devices that manipulate signals based on operational instructions. For instance, the processor(s) 702 may be one or more hardware processors and/or logic circuits of any suitable type specifically programmed or configured to execute the algorithms and processes described herein. The processor(s) 702 can be configured to fetch and execute computer-readable instructions stored in the computer-readable media 704, which can program the processor(s) 702 to perform the functions described herein.

The computer-readable media 704 include volatile and nonvolatile memory and/or removable and non-removable media implemented in any type of technology for storage of information, such as computer-readable instructions, data structures, program modules, or other data. Such computer-readable media 704 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the inmate agent device 700, the computer-readable media 704 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 704 is used to store any number of functional components that are executable by the processors 702. In many implementations, these functional components comprise instructions or programs that are executable by the processors and that, when executed, specifically configure the one or more processors 702 to perform the actions attributed above to the inmate agent devices (e.g., the agent device 106 and the agent devices 206). In addition, the computer-readable media 704 store data used for performing the operations described herein.

In the illustrated example, the functional components stored in the computer-readable media 704 include a client agent application 712. The client agent application 712 manages the inmate agent device 700 within a video kiosk inmate system, such as the video kiosk inmate system 100 and the video kiosk inmate system 200. In some embodiments, the client agent application 712 manages the sending of integrity information (e.g., the integrity response 240), presence information (e.g., the presence status 248), and payment information (e.g., the payment communication 258). Further, the client agent application 712 manages the creation of secure memory locations in the computer readable media 704, and the storing of inmate information (e.g., the inmate information response 298) in the secure memory locations. Additionally, the client agent application 712 may locally perform the functions of the security module 224.

Additional functional components stored in the computer-readable media 704 include an operating system 714 for controlling and managing various functions of the inmate agent device 700. The inmate agent device 700 also includes or maintains other functional components and data, such as other modules and data 716, which include programs, drivers, etc., and the data used or generated by the functional components. Further, the inmate agent device 700 includes many other logical, programmatic and physical components, of which those described above are merely examples that are related to the discussion herein.

The communication interface(s) 706 includes one or more interfaces and hardware components for enabling communication with various other devices, such as the kiosk management server 102, the kiosk management server 202, the kiosk management server 600, the kiosk device 104, the kiosk devices 204, the inmate device 110, the inmate devices 210, or other computing devices, over the network(s) 114 and 222. For example, communication interface(s) 706 facilitates communication through one or more of the Internet, cable networks, cellular networks, wireless networks (e.g., Wi-Fi, cellular) and wired networks. As several examples, the kiosk management server 600 and the agent device 700 communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCMCIA slot and card, etc.

FIG. 7 further illustrates that the inmate agent device 700 includes a display 718. Depending on the type of computing device used as the inmate agent device 700, the display 718 may employ any suitable display technology. For example, the display 718 may be a liquid crystal display, a light emitting diode display, or any other suitable type of display able to present digital content thereon. In some embodiments, the display 718 includes touch sensor with the display 718 to provide a touchscreen display configured to receive touch inputs for enabling interaction with a graphic interface presented on the display 718. Accordingly, implementations herein are not limited to any particular display technology. Alternatively, in some other embodiments, the inmate agent device 700 may not include a display 718.

Furthermore, the inmate agent device 700 is equipped with various input/output (I/O) devices 720. Such I/O devices 720 include a display, various user interface controls (e.g., buttons, joystick, keyboard, mouse, touch screen, etc.), audio speakers, connection ports, sensors (e.g., accelerometer, gyroscope, a compass, localization sensors, photometer, magnetometer, fingerprint sensors, etc.), and so forth. Additionally, the inmate agent device 700 includes various other components that are not shown, examples of which include removable storage, a power source, such as a battery and power control unit, and so forth.

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 8:
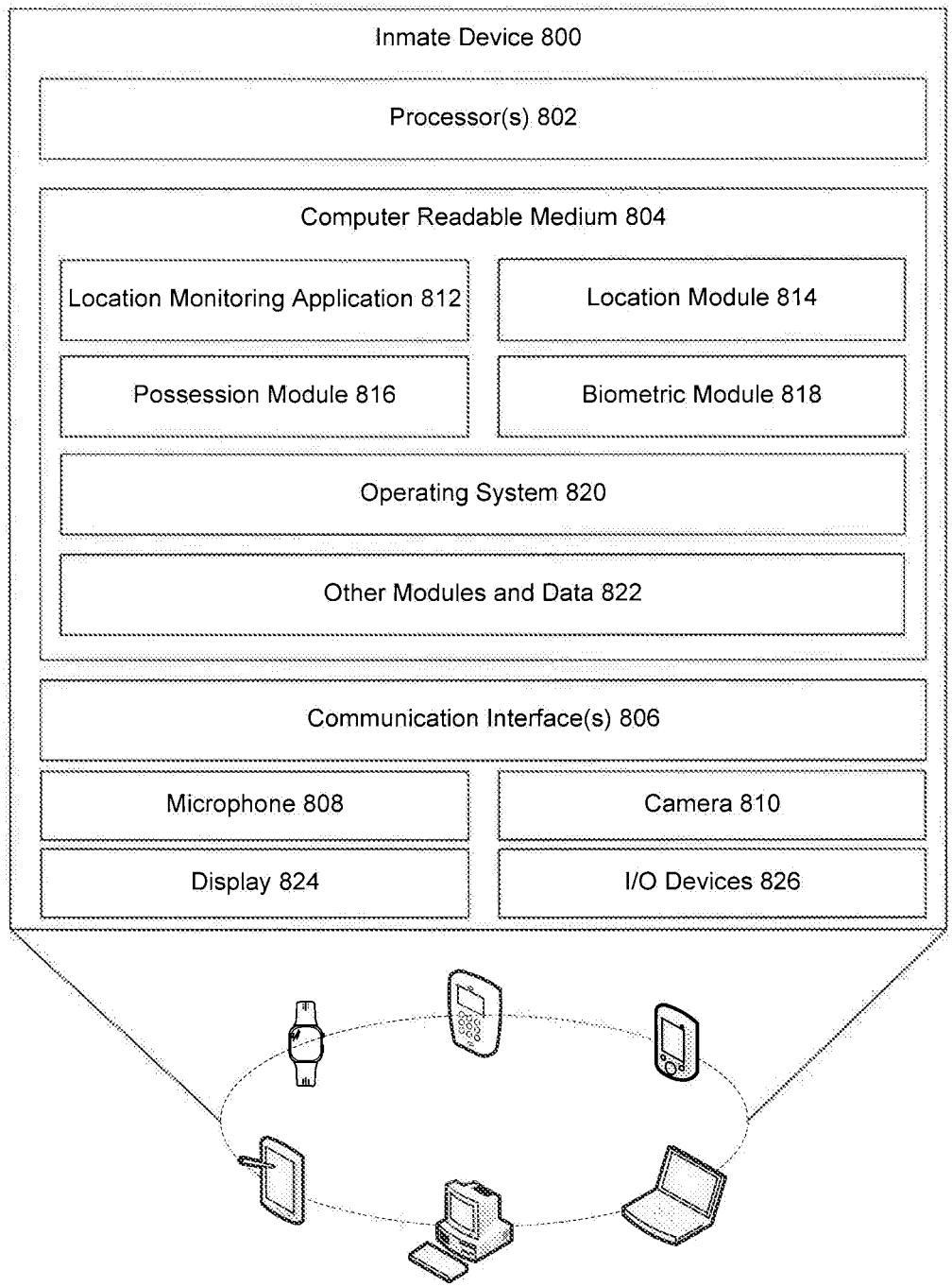
FIG. 8 illustrates a block diagram of select components of an example inmate device, according to exemplary embodiments.

FIG. 8 illustrates select example components of the inmate device 800 (e.g., the inmate device 110 and the inmate devices 210) that implements the functionality described above, according to an exemplary embodiment. The inmate device 800 may be any of a number of different types of personal computing devices. Some examples of the inmate device 800 include smart phones and mobile communication devices, tablet computing devices, desktops, laptops, netbooks and other portable computers, wearable computing devices, and any other portable device capable of sending communications and performing the functions according to the techniques described herein.

In the illustrated example, the inmate device 800 includes one or more processors 802, one or more computer-readable media 804, one or more communication interfaces 806, a microphone 808, and a camera 810. Each processor 802 is a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 include volatile and nonvolatile memory and/or removable and non-removable media implemented in any type of technology for storage of information, such as computer-readable instructions, data structures, program modules, or other data. Such computer-readable media 804 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the inmate device 800, the computer-readable media 804 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 804 is used to store any number of functional components that are executable by the processors 802. In many implementations, these functional components comprise instructions or programs that are executable by the processors and that, when executed, specifically configure the one or more processors 802 to perform the actions attributed above to the inmate devices (e.g., the inmate device 110 and the inmate devices 210). In addition, the computer-readable media 804 store data used for performing the operations described herein.

In the illustrated example, the functional components stored in the computer-readable media 804 include a location monitoring application 812, a location module 814, a possession module 816, and a biometric module 818.

In some embodiments, the location monitoring application 812 manages the sending of installation information (e.g., the installation confirmation 268), location information (e.g., the location information 262) and possession information (e.g., the possession response 278) to the kiosk management servers 102, 202, and 600. Further, the location module 814 determines a location identifier (e.g., the location identifier 272) of the inmate device 800. In some embodiments, the location module includes a global positioning system (GPS), an indoor positioning system (IPS) device, or a global'naya navigatsionnaya sputnikovaya sistema (GLONASS) device.

In some embodiments, the possession module 816 locally performs functions of the tracking module 236. For example, the possession module 816 locally determines whether an inmate is in possession of the inmate device 800 and sends the result to the kiosk management server 202. Further, the biometric module 818 captures and authenticates biometric information using components of the inmate device 800 (e.g., the microphone, the camera, etc.). For example, the biometric module 818 directs the microphone 808 and camera 810 to capture biometric samples from a user of the inmate device 800. Further, the biometric module 818 authenticates a user of the inmate device 800 based on the captured biometric samples, or sends the authentication information to the kiosk management server 600 for completion of an authentication process.

Additional functional components stored in the computer-readable media 804 include an operating system 820 for controlling and managing various functions of the inmate device 800. For example, the operating system 820 may manage the sending of integrity information (e.g., integrity response 240) associated with the inmate device 800. The inmate device 800 also includes or maintains other functional components and data, such as other modules and data 822, which include programs, drivers, etc., and the data used or generated by the functional components. For example, the other modules and data may include modules for sending payment information (e.g., the payment communication 258). Further, the inmate device 800 includes many other logical, programmatic and physical components, of which those described above are merely examples that are related to the discussion herein.

The communication interface(s) 806 includes one or more interfaces and hardware components for enabling communication with various other devices, such as the kiosk management servers 102, 202, and 600, the agent devices 106 and 206, or other computing devices, over the network (s) 114 and 222. For example, communication interface(s) 806 facilitates communication through one or more of the Internet, cable networks, cellular networks, wireless networks (e.g., Wi-Fi, cellular) and wired networks. As several examples, the kiosk management server 202 and the inmate device 800 communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCMCIA slot and card, etc.

FIG. 8 further illustrates that the inmate device 800 includes a display 824. Depending on the type of computing device used as the inmate device 800, the display 824 may employ any suitable display technology. For example, the display 824 may be a liquid crystal display, a light emitting diode display, or any other suitable type of display able to present digital content thereon. In some embodiments, the display 824 includes touch sensor with the display 824 to provide a touchscreen display configured to receive touch inputs for enabling interaction with a graphic interface presented on the display 824. Accordingly, implementations herein are not limited to any particular display technology. Alternatively, in some other embodiments, the inmate device 800 may not include a display 824.

Furthermore, the inmate device 800 is equipped with various input/output (I/O) devices 826. Such I/O devices 826 include a display, various user interface controls (e.g., buttons, joystick, keyboard, mouse, touch screen, etc.), audio speakers, connection ports, sensors (e.g., accelerometer, gyroscope, a compass, localization sensors, photometer, magnetometer, fingerprint sensors, etc.), and so forth. Additionally, the inmate device 800 includes various other components that are not shown, examples of which include removable storage, a power source, such as a battery and power control unit, and so forth.

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 9:
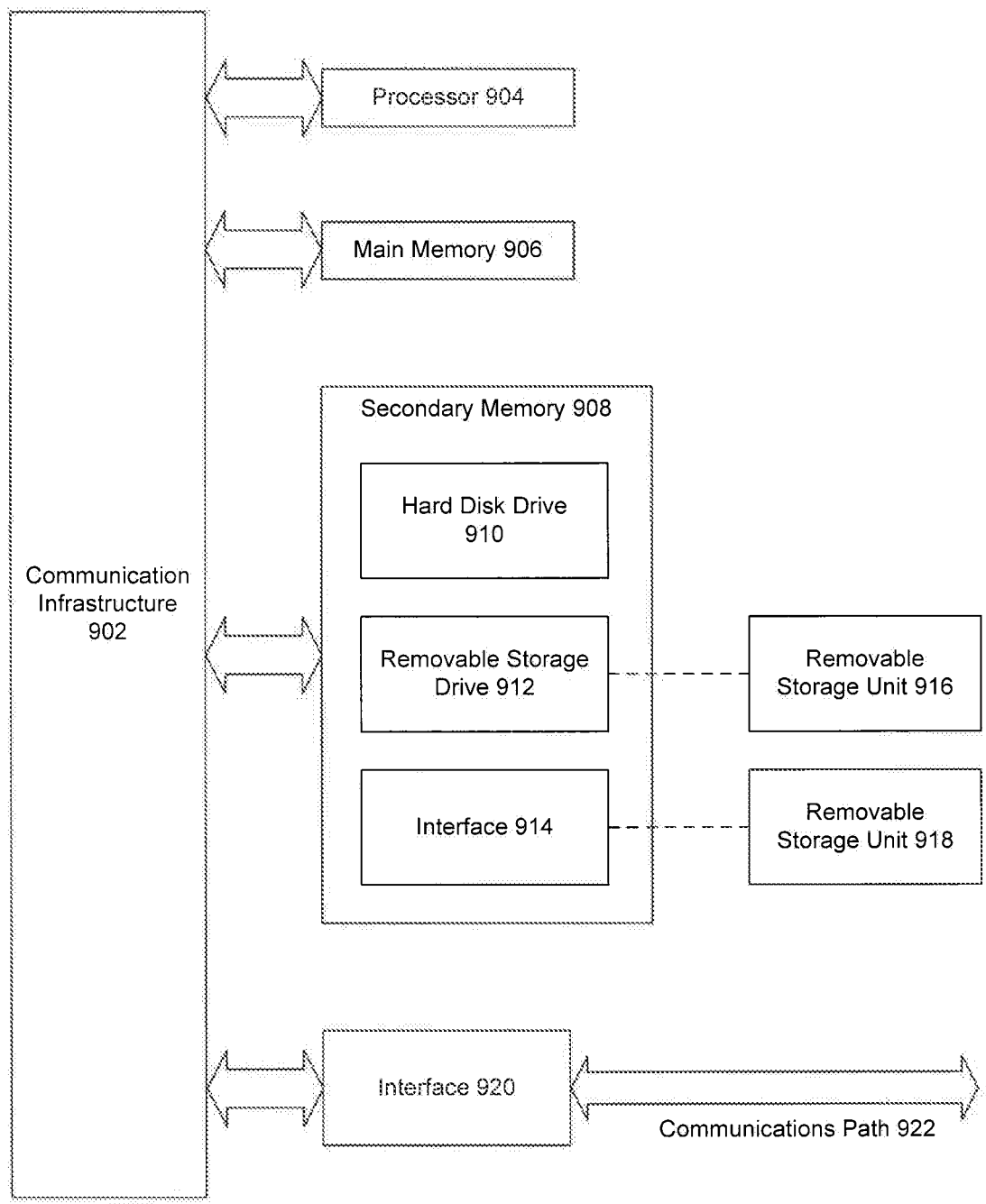
FIG. 9 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 3-4 can be implemented in the environment of one or more computer systems or other processing systems. An example of such a computer system 900 is shown in FIG. 9. One or more of the modules depicted in the previous figures can be at least partially implemented on one or more distinct computer systems 900.

Computer system 900 includes one or more processors, such as processor 904. Processor 904 can be a special purpose or a general purpose digital signal processor. Processor 904 is connected to a communication infrastructure 902 (for example, a bus or network). Various software implementations are described in terms of this exemplary computer system. After reading this description, it will become apparent to a person skilled in the relevant art(s) how to implement the disclosure using other computer systems and/or computer architectures.

Computer system 900 also includes a main memory 906, preferably random access memory (RAM), and may also include a secondary memory 908. Secondary memory 908 may include, for example, a hard disk drive 910 and/or a removable storage drive 912, representing a floppy disk drive, a magnetic tape drive, an optical disk drive, or the like. Removable storage drive 912 reads from and/or writes to a removable storage unit 916 in a well-known manner. Removable storage unit 916 represents a floppy disk, magnetic tape, optical disk, or the like, which is read by and written to by removable storage drive 912. As will be appreciated by persons skilled in the relevant art(s), removable storage unit 916 includes a computer usable storage medium having stored therein computer software and/or data.

In alternative implementations, secondary memory 908 may include other similar means for allowing computer programs or other instructions to be loaded into computer system 900. Such means may include, for example, a removable storage unit 918 and an interface 914. Examples of such means may include a program cartridge and cartridge interface (such as that found in video game devices), a removable memory chip (such as an EPROM, or PROM) and associated socket, a thumb drive and USB port, and other removable storage units 918 and interfaces 914 which allow software and data to be transferred from removable storage unit 918 to computer system 900.

Computer system 900 may also include a communications interface 920. Communications interface 920 allows software and data to be transferred between computer system 900 and external devices. Examples of communications interface 920 may include a modem, a network interface (such as an Ethernet card), a communications port, a PCMCIA slot and card, etc. Software and data transferred via communications interface 920 are in the form of signals which may be electronic, electromagnetic, optical, or other signals capable of being received by communications interface 920. These signals are provided to communications interface 920 via a communications path 922. Communications path 922 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 916 and 918 or a hard disk installed in hard disk drive 910. These computer program products are means for providing software to computer system 900.

Computer programs (also called computer control logic) are stored in main memory 906 and/or secondary memory 908. Computer programs may also be received via communications interface 920. Such computer programs, when executed, enable the computer system 900 to implement the present disclosure as discussed herein. In particular, the computer programs, when executed, enable processor 904 to implement the processes of the present disclosure, such as any of the methods described herein. Accordingly, such computer programs represent controllers of the computer system 900. Where the disclosure is implemented using software, the software may be stored in a computer program product and loaded into computer system 900 using removable storage drive 912, interface 914, or communications interface 920.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A method performed by a kiosk management server, comprising:
receiving, from a client device and via a first communication channel, a login request to a presence based service, wherein the presence based service monitors an availability of a plurality of inmate agents and the login request includes a client identifier associated with an inmate agent and a client credential;
authenticating the client device based on the client identifier and the client credential;
setting a presence status of the inmate agent to available;
determining client information corresponding to the inmate agent based on the client identifier;

transmitting the client information to a kiosk device located in a booking facility based on the presence status;
receiving a selection of the inmate agent by a user of the kiosk device;
initializing an out of band communication channel between a user device, the client device, and the kiosk device, the out of band communication channel being independent of the first communication channel of the presence based service and having an end to end encryption to protect communication via the out of band communication channel;
based on an establishment of the out of band communication channel, transmitting an installation executable to the user device associated with the user of the kiosk device via the out of band communication channel, wherein the installation executable is associated with an application configured to monitor a location of the user via the user device;
monitoring the location of the user;
generating a graphical representation of the location of the user; and
transmitting the graphical representation to the client device for display.

2. The method of claim 1, further comprising:
determining an integrity value of the client device, the integrity value representing an integrity of an operating system of the client device;
identifying the user of the kiosk device;
determining inmate information associated with the user;
requesting creation of a secure memory location on the client device;
requesting storage of the inmate information at the secure memory location; and
transmitting the inmate information to the secure memory location.

3. The method of claim 1, further comprising:
determining a fee associated with the inmate agent based on the client information;
transmitting a payment request to the kiosk device, the payment request in an amount corresponding to the fee;
receiving payment information from the kiosk device;
verifying the payment information; and
wherein the initializing is based on the verifying of the payment information.

4. The method of claim 1, further comprising:
identifying the user of the kiosk device;
determining inmate information associated with the user;
determining at least one of a fine or bond associated with the inmate information;
transmitting a payment request to the kiosk device, the payment request in an amount corresponding to the at least one of the fine or bond;
receiving payment information from at least one of the kiosk device or the user device associated with the user; and
verifying the payment information.

5. The method of claim 1, further comprising:
receiving confirmation of installation of the application on the user device; and
generating an association between the application on the user device and the client device.

6. The method of claim 1, further comprising:
receiving historic location information from the user device; and generating a geographic boundary based on the historic location information, the geographic boundary including a historic location frequented by the user device.

7. The method of claim 6, further comprising:
determining whether the location of the user is outside of the geographic boundary; and
transmitting a warning communication to the client device based on determining whether the location of the user is outside of the geographic boundary.

8. The method of claim 1, wherein the client information includes at least one of a client name, client contact information, a client biography, client affiliations, or client fees.

9. The method of claim 1, further comprising transmitting at least one of a video call, telephone call, or text based communication via the out of band communication channel to the user device.

10. A non-transitory computer-readable device having instructions stored thereon that, when executed by at least one computing device of a kiosk management server, cause the at least one computing device to perform operations comprising:
receiving, from a client device and via a first communication channel, a login request to a presence based service, wherein the presence based service monitors an availability of a plurality of inmate agents and the login request includes a client identifier associated with an inmate agent and a client credential;
authenticating the client device based on the client identifier and the client credential;
setting a presence status of the inmate agent to available;
determining client information corresponding to the inmate agent based on the client identifier;
transmitting the client information to a kiosk device located in a booking facility;
receiving a selection of the inmate agent by a user of the kiosk device;
initializing an out of band communication channel between a user device, the client device, and the kiosk device, the out of band communication channel being independent of the first communication channel of the presence based service and having an end to end encryption to protect communication via the out of band communication channel;
based on an establishment of the out of band communication channel, transmitting an installation executable to the user device associated with the user of the kiosk device via the out of band communication channel, wherein the installation executable is associated with an application configured to monitor a location of the user via the user device;
monitoring the location of the user;
generating a graphical representation of the location of the user; and
transmitting the graphical representation to the client device for display.

11. The non-transitory computer-readable device of claim 10, the operations further comprising:
determining an integrity value of the client device, the integrity value representing an integrity of an operating system of the client device;
identifying the user of the kiosk device;
determining inmate information associated with the user;
requesting creation of a secure memory location on the client device;
requesting storage of the inmate information at the secure memory location; and
transmitting the inmate information to a client storage.

12. The non-transitory computer-readable device of claim 10, the operations further comprising:
   receiving confirmation of installation of the application on the user device; and
   generating an association between the application on the user device and the client device.

13. The non-transitory computer-readable device of claim 10, wherein the client information includes at least one of a client name, client contact information, a client biography, client affiliations, or client fees.

14. The non-transitory computer-readable device of claim 10, the operations further comprising transmitting at least one of a video call, telephone call, or text based communication via the out of band communication channel to the user device.

15. An inmate assistance server comprising:
   a memory; and
   one or more processors and/or circuits of a kiosk management server coupled to the memory and configured to:
      transmit, via a first communication channel, inmate agent information to a kiosk device, the inmate agent information indicating that an inmate agent is available to assist an inmate using the kiosk device;
      receive a selection of the inmate agent by a user of the kiosk device;
      initialize an out of band communication channel between an inmate device, an inmate agent device, and the kiosk device, the out of band communication channel being independent of the first communication channel of a presence based service and having an end to end encryption to protect communication via the out of band communication channel, and wherein the presence based service monitors an availability of a plurality of inmate agents;
      determine an integrity value of the inmate device associated with the inmate;
      send, via the out of band communication channel to the inmate device, an installation executable associated with a location monitoring application based on the integrity value, wherein the location monitoring application is configured to monitor a location of the user via the inmate device;
      confirm installation of the location monitoring application on the inmate device;
      associate the inmate agent with the location monitoring application on the inmate device;
      receive a location information of the user from the inmate device;
      send the location information to the inmate agent device associated with the inmate agent;
      generate a graphical representation of the location of the inmate device; and
      transmit the graphical representation to the inmate agent device for display.

16. The inmate assistance server of claim 15, wherein the one or more processors and/or circuits are further configured to:
   receive historic location information from the inmate device;
   determine a geographic region associated with the inmate device;
   determine a relationship between the location information and the geographic region; and
   send a warning communication to the inmate agent device based on the relationship between the location information and the geographic region.

17. The inmate assistance server of claim 15, wherein the one or more processors and/or circuits are further configured to:
   send a possession request to the inmate device;
   receive a possession response from the inmate device;
   determine a possession status of the inmate device based on the possession response; and
   send a warning communication to the inmate agent device based on the possession status.

18. The inmate assistance server of claim 17, wherein to determine the possession status of the inmate device based on the possession response, the one or more processors and/or circuits are further configured to verify at least one of authentication information or device activity information included in the possession response.

* * * * *